US012789914B2

(12) United States Patent
Park

(10) Patent No.: US 12,789,914 B2
(45) Date of Patent: Nov. 10, 2026

(54) JACK-UP COVER AND JACK-UP COVER APPARATUS FOR ELECTRIC VEHICLE

(71) Applicants: HYUNDAI MOTOR COMPANY, Seoul (KR); KIA CORPORATION, Seoul (KR)

(72) Inventor: Sae-Rom Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 302 days.

(21) Appl. No.: 18/753,673

(22) Filed: Jun. 25, 2024

(65) Prior Publication Data

US 2025/0196934 A1 Jun. 19, 2025

(30) Foreign Application Priority Data

Dec. 13, 2023 (KR) ........................ 10-2023-0180439

(51) Int. Cl.

| | |
|---|---|
| ***B62D 35/02*** | (2006.01) |
| ***B60R 13/08*** | (2006.01) |
| ***B62D 25/02*** | (2006.01) |
| ***B62D 25/20*** | (2006.01) |
| *B60K 1/04* | (2019.01) |

(52) U.S. Cl.

CPC ...... *B62D 25/2036* (2013.01); *B60R 13/0861* (2013.01); *B62D 25/025* (2013.01); *B62D 35/02* (2013.01); *B60K 2001/0438* (2013.01)

(58) Field of Classification Search

CPC .. B62D 25/2036; B62D 25/025; B62D 35/02; B62D 25/2081; B60R 13/0861; B60K 2001/0438

USPC .......................................... 296/193.07, 180.1

See application file for complete search history.

(56) References Cited

U.S. PATENT DOCUMENTS

| | | | | |
|---|---|---|---|---|
| 11,820,220 | B2 | 11/2023 | Kim et al. | |
| 2020/0114973 | A1* | 4/2020 | Takahashi | B62D 25/2036 |
| 2024/0075800 | A1* | 3/2024 | Asa | B60K 1/04 |

FOREIGN PATENT DOCUMENTS

| | | | | |
|---|---|---|---|---|
| DE | 4322433 C1 * | 8/1994 | | B62D 25/24 |
| EP | 1845012 A1 * | 10/2007 | | B62D 25/2081 |
| JP | 2020045063 A * | 3/2020 | | |
| KR | 10-2022-0076567 | 6/2022 | | |

OTHER PUBLICATIONS

JP2006298200A with English translation; Nagasaka; Nov. 2, 2006 (Year: 2026).*

(Continued)

*Primary Examiner* — Roger L Pang

(74) *Attorney, Agent, or Firm* — Fish & Richardson P.C.

(57) ABSTRACT

The present disclosure provides a jack-up cover for an electric vehicle, which is fastened on an under-vehicle cover to cover a lower portion of a jack-up flange, wherein one end portion of the jack-up cover is fastened to an end portion of a battery part side of the under-vehicle cover, the other end portion thereof is fastened to an end portion of a side sill molding side of the under-vehicle cover or the side sill molding, and the jack-up cover is detachable from the under-vehicle cover, and, the jack-up cover can secure aerodynamic performance regardless of a jack-up method such as a jack-up flange or separate jack-up pad and can be applied to various layouts such as a shape and position of a battery.

18 Claims, 9 Drawing Sheets

(56) References Cited

OTHER PUBLICATIONS

WO2025141753A1 with English translation; Makita et al.; Jul. 3, 2025 (Year: 2026).*
English translation of EP1845012A1; https://translationportal.epo.org; Jun. 2, 2026 (Year: 2026).*
English translation of JP2020045063A; https://translationportal.epo.org; Jun. 2, 2026 (Year: 2026).*

* cited by examiner

JACK-UP COVER AND JACK-UP COVER APPARATUS FOR ELECTRIC VEHICLE

CROSS-REFERENCE TO RELATED APPLICATION

This application claims priority to Korean Patent Application No. 10-2023-0180439, filed on Dec. 13, 2023, which is incorporated herein by reference in its entirety.

TECHNICAL FIELD

The present disclosure relates to a jack-up cover for covering a jack-up flange for jack-up of an electric vehicle.

BACKGROUND

In the case of electric vehicles, the importance of an under-vehicle cover is emerging to secure fuel efficiency, and their application is expanding. The aerodynamic contribution of the under-vehicle cover may improve together with the improvement in an upper body, and the aerodynamic improvement effect by a shape of the undercover is known, and there is a trend that a covering area is increased to improve aerodynamics and an under-vehicle cover is improved to a structure for securing a sense of unity.

As illustrated in FIG. 1, an under-vehicle cover 20 covers a vehicle body 11 by connecting a battery part 13 to a side sill molding 12 under the vehicle body 11.

However, since a side sill undercover, which has a significant impact on the aerodynamic effect, is coupled in a structure that covers a jack-up flange 21 formed under the vehicle body 11, for example, at four places to jack up a vehicle, there is a problem that it is difficult to use previously used jack-up points.

In order to solve this, there are cases in which molding parts are separated to apply a separate pad or use a jack-up flange, but in this case, there is a limit that aerodynamic performance deteriorates.

SUMMARY

The present disclosure has been made in efforts to solve the above problems and is directed to providing a jack-up cover and a jack-up cover apparatus for an electric vehicle, which may secure aerodynamic performance regardless of a jack-up method such as a jack-up flange or separate jack-up pad and can be applied to various layouts such as a shape and position of a battery.

A jack-up cover for an electric vehicle according to one aspect of the present disclosure, which is fastened on an under-vehicle cover to cover a lower portion of a jack-up flange, wherein one end portion of the jack-up cover is fastened to an end portion of a battery part side of the under-vehicle cover, and the other end portion thereof is fastened to an end portion of a side sill molding side of the under-vehicle cover or to the side sill molding.

In addition, the jack-up cover may include a lower cover part corresponding to a lower portion of the jack-up cover, a side cover part having one end portion formed to extend upward from one end portion of the lower cover part, and an upper cover part having one end portion formed to extend laterally from the other end portion of the side cover part, wherein the lower cover part may be fastened to the end portion of the battery part side of the under-vehicle cover, and the upper cover part may be fastened to the end portion of the side sill molding side of the under-vehicle cover.

Here, the side cover part may be formed to extend upward to be inclined or curved from the one end portion of the lower cover part.

In addition, the jack-up cover may further include a first fastening part extending to protrude laterally from the other end portion of the lower cover part and fastened by being inserted into a fastening hole formed in the end portion of the battery part side of the under-vehicle cover.

In addition, a plurality of first fastening parts may be formed.

In addition, the first fastening part may extend to protrude laterally after being bent to be stepped higher than the lower cover part.

Furthermore, the jack-up cover may further include a first clip part extending to protrude from the other end portion of the upper cover part and fastened to the under-vehicle cover.

In addition, a plurality of first clip parts may be formed.

In addition, the first clip part may be formed to extend downward from the under-vehicle cover and may have a lower end portion fastened to a first clip coupling flange formed with a bent hooking portion.

In addition, the first clip part may be formed to protrude laterally after extending upward from the upper cover, and a protruding portion formed to protrude laterally may be fastened to the hooking portion of the first clip coupling flange.

In addition, the first clip part may be formed to extend downward from the protruding portion, and a clip extending portion elastically deformable by an external force may be formed.

Furthermore, the jack-up cover may further include a second clip part extending to protrude from both side end portions of the jack-up cover and fastened to the under-vehicle cover.

In addition, an upper end portion of the second clip part may be formed to protrude laterally, and a protruded protruding portion of the second clip part may be fastened to a second clip coupling flange formed to extend upward from the under-vehicle cover.

In particular, a thickness of a lower end portion of the second clip part may be formed to be smaller than a thickness of a middle end portion thereof.

In some examples, a drainage hole may be formed in the lower cover part, and a display part visually distinguished from other portions of the side cover part may be formed on the side cover part.

In addition, the jack-up flange may be formed on the under-vehicle cover covering the vehicle body by connecting a battery part with a side sill molding under the vehicle body.

In addition, the jack-up cover may be detachable from the under-vehicle cover.

Furthermore, a lower end line of the jack-up cover may have a structure extending colinearly with a lower end line of the battery part.

According to the jack-up cover apparatus of the present disclosure, it is possible to secure aerodynamic performance by the detachable jack-up cover regardless of the jack-up method such as a jack-up flange or separate jack-up pad.

In addition, the jack-up cover apparatus can be applied to various layouts such as a shape and position of a battery.

Therefore, it is possible to secure battery stability by protecting the battery from foreign substances.

DETAILED DESCRIPTION

For a full understanding of the present disclosure, operational advantages of the present disclosure, and objects to be achieved by practicing the present disclosure, reference should be made to the accompanying drawings, which illustrate implementations of the present disclosure, and contents described in the accompanying drawings.

In the present disclosure, a description of known techniques or repetitive descriptions that may unnecessarily obscure the gist of the present disclosure may be reduced or omitted.

Figure 1:
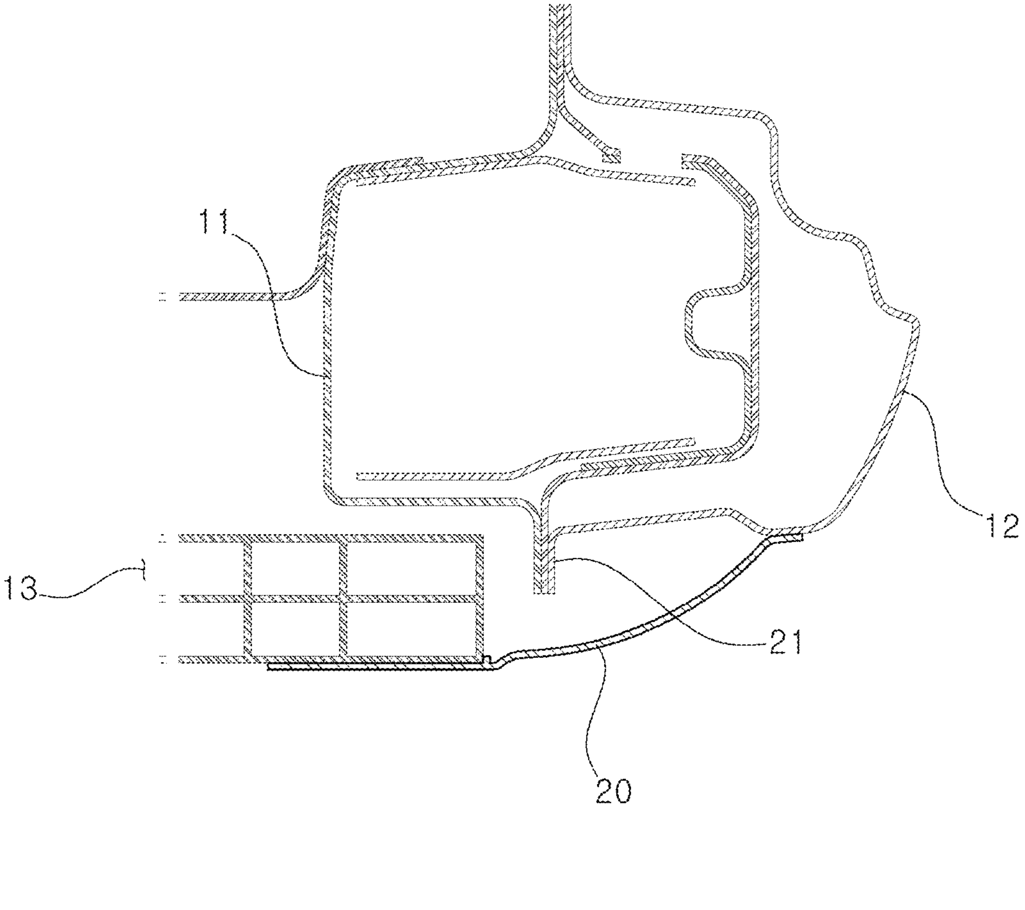
FIG. 1 (PRIOR ART)
FIG. 1 is a view illustrating a cross-sectional shape of a conventional under-vehicle cover in related art.
Figure 2:
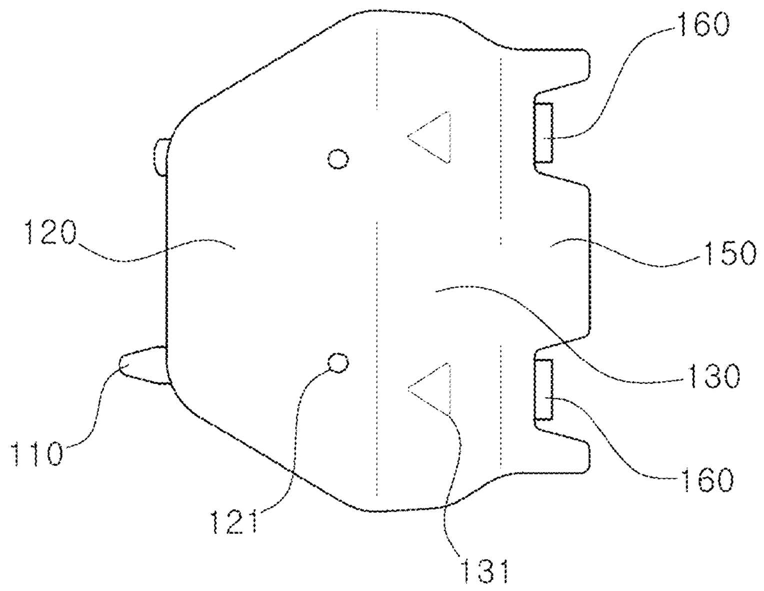
FIG. 2 is a view illustrating an example of a jack-up cover according to the present disclosure.
Figure 3:
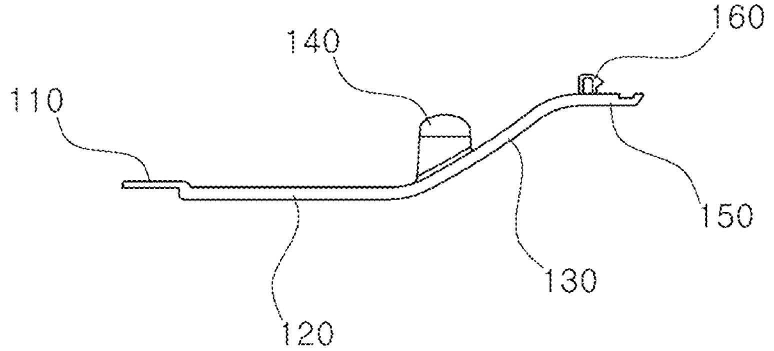
FIG. 3 is a view illustrating an example of a shape of a side surface of the jack-up cover of FIG. 2.
Figure 4:
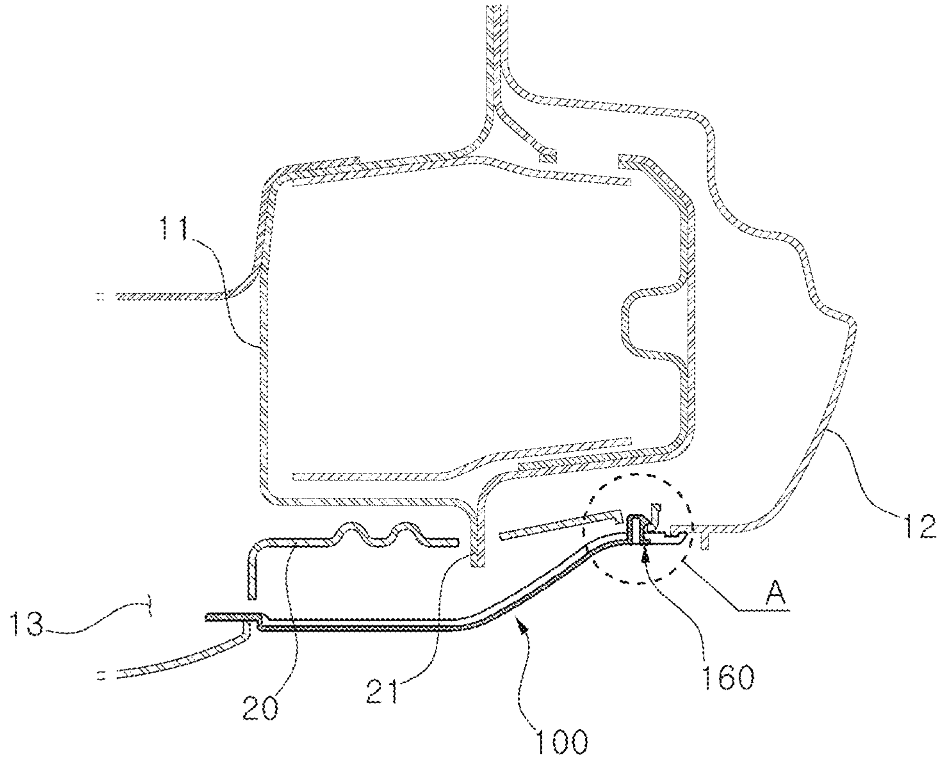
FIG. 4 is a view illustrating an example of a cross-sectional shape in a state in which the jack-up cover is mounted.

FIG. 2 is a view illustrating a jack-up cover, and FIG. 3 is a view illustrating a shape of a side surface of the jack-up cover of FIG. 2. In addition, FIG. 4 is a view illustrating a cross-sectional shape in a state in which a jack-up cover is mounted.

Hereinafter, a jack-up cover and a jack-up cover apparatus for an electric vehicle according to one or more implementations of the present disclosure will be described with reference to FIGS. 2 to 4.

In some implementations, the jack-up cover apparatus includes an under-vehicle cover 20 for covering a vehicle body 11 by connecting a battery part 13 and a side sill molding 12 under the vehicle body 11, and a jack-up cover 100 detachably mounted on the under-vehicle cover 20 to cover a lower portion of a jack-up flange 21 formed on the under-vehicle cover 20.

The jack-up cover 100 may include a lower cover part 120 and a side cover part 130 and further include an upper cover part 150.

The lower cover part 120 may correspond to a lower portion of the jack-up cover 100, and the side cover part 130 may have one end portion formed to extend upward from one end portion of the lower cover part 120 to cover sides with respect to the vehicle body 11 and may be formed to be inclined upward. Alternatively, the side cover part 130 may be formed to be curved and inclined upward.

In addition, the upper cover part 150 may be formed to extend laterally from the other end portion of the side cover part 130 and omitted when the side cover part 130 functions as the upper cover part 150.

A drainage hole 121 may be formed in the lower cover part 120, and water may be drained through the drainage hole 121 in a traveling state or stopped state.

In addition, a display part 131 may be formed on the side cover part 130, thereby providing visibility so that the user may check whether the jack-up cover 100 is mounted from the side. The display part 131 may be formed to be distinguished from other portions of the side cover part 130 by embossing, engraving, coloring, or the like.

Next, in order for one side of the jack-up cover 100 to be mounted on the under-vehicle cover 20, a first fastening part 110 extending to protrude laterally from the other end portion corresponding to the battery part 13 side and fastened to the under-vehicle cover 20 may be formed on the lower cover part 120, and a plurality of first fastening parts 110 may be formed.

In some implementations, the first fastening part 110 is bent to be stepped higher than the lower cover part 120 and then extends to protrude laterally.

In addition, as illustrated, the first fastening part 110 is fastened by being inserted into the fastening hole formed in an end portion of the battery part 13 side of the under-vehicle cover 20.

In addition, in order for the other side of the jack-up cover 100 to be mounted on the under-vehicle cover 20, a first clip part 160 extending to protrude from the other end portion corresponding to the side sill molding 12 side and fastened to the under-vehicle cover 20 may be formed on the upper cover part 150, and a plurality of first clip parts 160 may be formed. An end portion of the other side of the jack-up cover 100 may be directly fastened to an end portion of the side sill molding side of the under-vehicle cover 20 or side sill molding.

Figure 5:
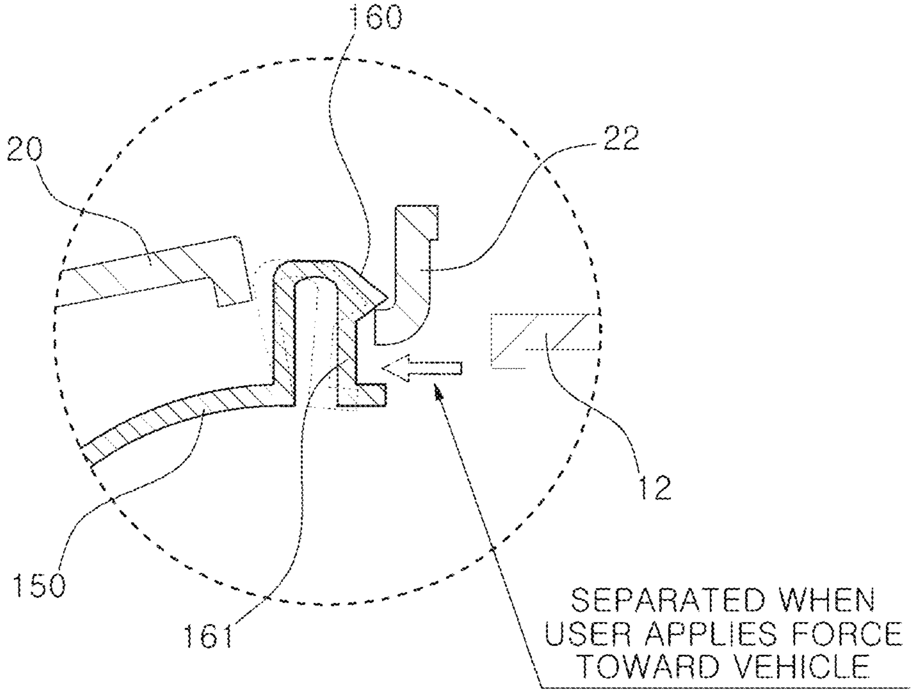
FIG. 5 is an enlarged view of portion A in FIG. 4.

As illustrated in FIGS. 4 and 5, the first clip part 160 is formed to extend downward from the under-vehicle cover 20 and has a lower end portion fastened to a first clip coupling flange 22 having a bent shape.

Since the first clip part 160 extends upward from the upper cover part 150 and then is formed to protrude laterally so that when fastened, a protruding portion crosses a hook portion of the first clip coupling flange 22, the protruding portion and the hook portion are fastened and thus the first clip part 160 is fastened not to move backward.

Furthermore, a clip extending portion 161 is formed to extend downward from the protruding portion. Therefore, the clip extending portion 161 is exposed downward of the first clip coupling flange 22 so that the user may perceive the clip extending portion 161 from the side and as illustrated, is formed to have an elastically bending structure together with a shape of the first clip part 160.

Therefore, when the user pushes the clip extending portion 161 toward the upper cover part 150 by applying a force, the first clip part 160 may be bent so that the protruding portion comes out of the first clip coupling flange 22 to allow the jack-up cover 100 to be separated from the under-vehicle cover 20.

In some examples, for more stable fastening, second clip parts 140 extending to protrude from both side end portions of the jack-up cover 100 may be formed on the both side end portions thereof, which will be described below.

Figure 6:
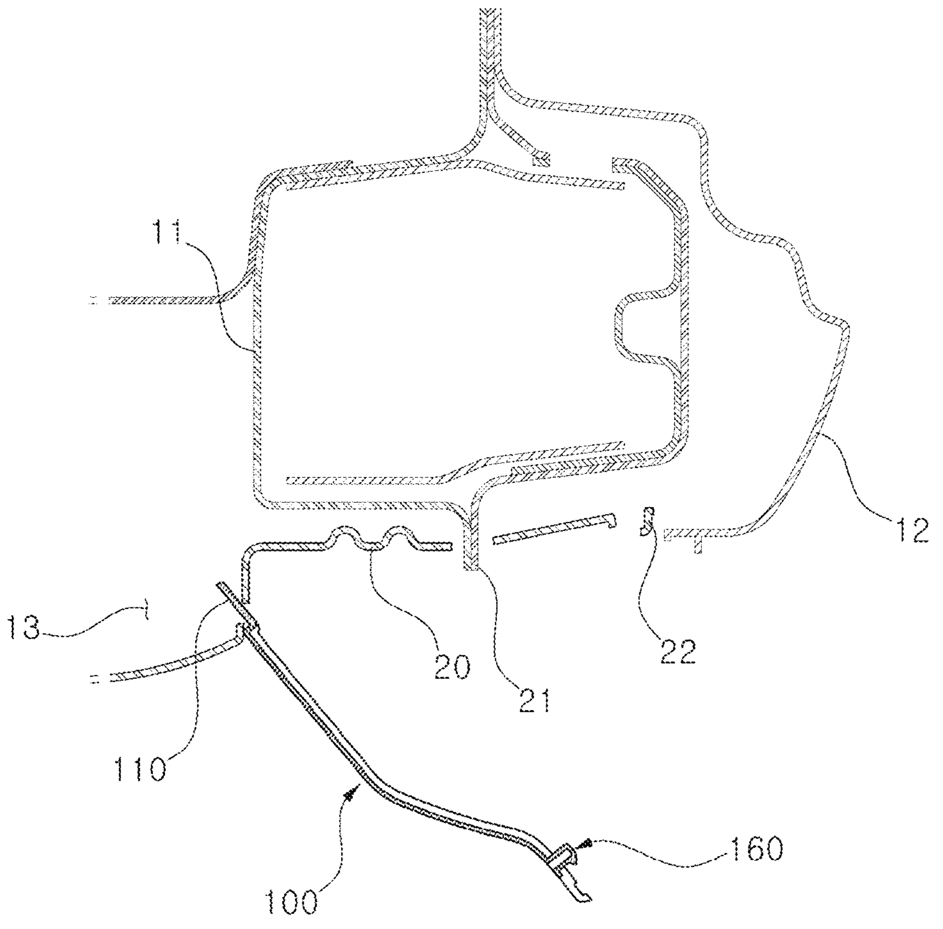
FIG. 6 is a view illustrating an example of a process in which the jack-up cover is mounted.
Figure 7:
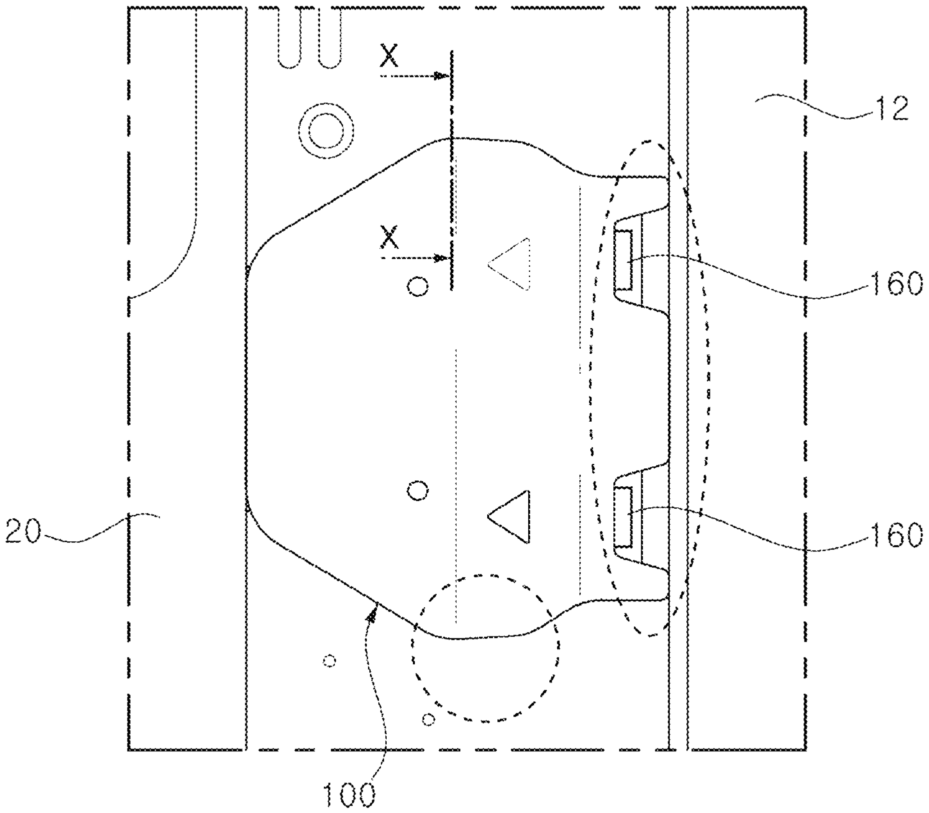
FIG. 7 is a view illustrating an example of the mounted state.

FIG. 6 is a view illustrating a process in which the jack-up cover is mounted, and FIG. 7 is a view illustrating the mounted state.

As illustrated in FIG. 6, the jack-up cover 100 is temporarily fastened by inserting the first fastening part 110 into the fastening hole formed in the end portion of the battery part side of the under-vehicle cover 20.

As illustrated, since the first fastening part 110 is formed to be stepped higher than the lower cover part 120, temporary fastening to the fastening hole is facilitated by a hooking structure by the step.

As described above, after the first fastening part 110 is temporarily fastened, the jack-up cover 100 is rotated counterclockwise in the drawing, and the first clip part 160 and the second clip part 140 are respectively connected to the first clip coupling flange 22 and a second clip coupling flange 23 to be fully fastened as illustrated in FIG. 7. Due to the hooking structure, the first clip part 160 and the second clip part 140 are fully fastened by applying a force to rear surfaces of the first clip part 160 and the second clip part 140 and pressing them.

Figure 8:
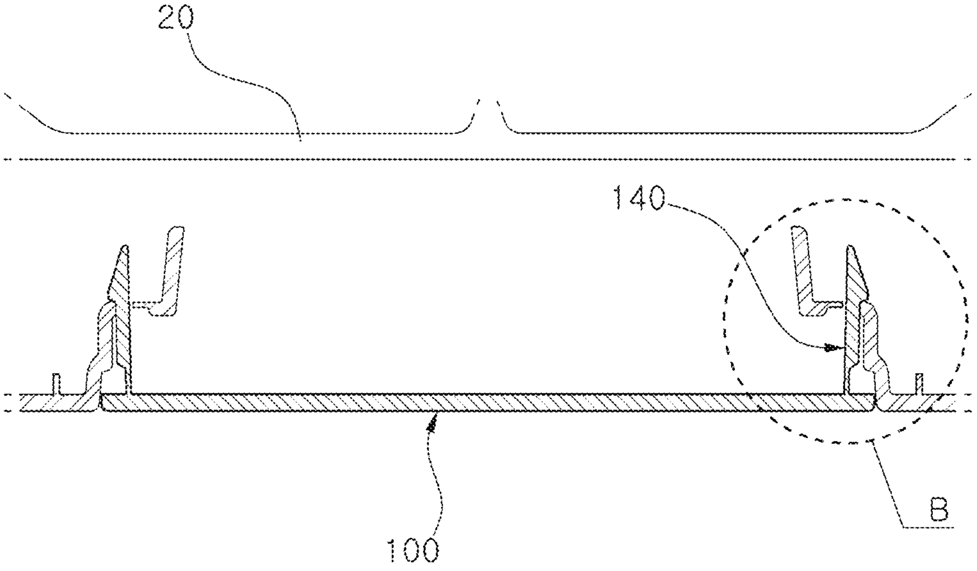
FIG. 8 is a cross-sectional view along line X-X in FIG. 7.
Figure 9:
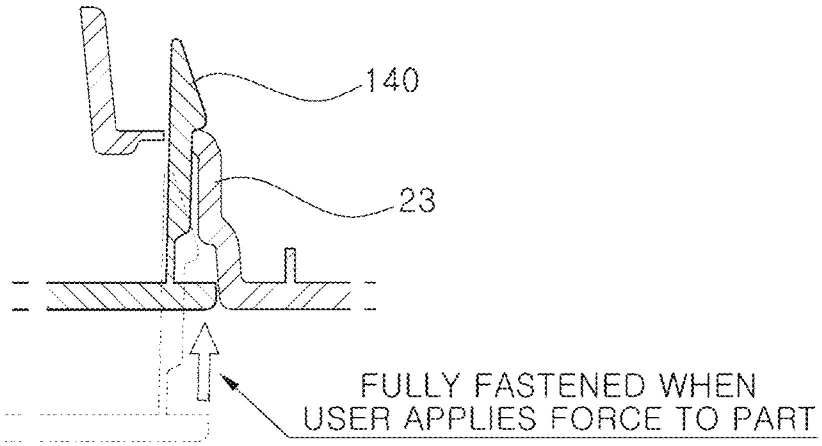
FIG. 9 is an enlarged view of portion B in FIG. 8.

Referring to FIG. 8, which is a cross section along line X-X in FIG. 7, and FIG. 9, which is an enlarged view of portion B in FIG. 8, the second clip part 140 is formed to protrude from both side end portions of the jack-up cover 100 and has an upper end portion formed to extend laterally.

In addition, since the corresponding second clip coupling flange 23 is formed to extend a predetermined length upward from the under-vehicle cover 20, the protruding portion of the upper end portion of the second clip part 140 is fastened by crossing an end portion of the second clip coupling flange 23.

In addition, the second clip part 140 is formed so that a thickness of a lower end portion is smaller than a thickness of a middle end portion. Therefore, when the upper cover part 150 or the side cover part 130 moves down after releasing the fastening of the first clip part 160, the second clip part 140 illustrated in FIG. 9 is elastically deformed counterclockwise in the drawing due to the smaller thickness of the lower end portion thereof so that the fastening with the second clip coupling flange 23 may be released.

Figure 10:
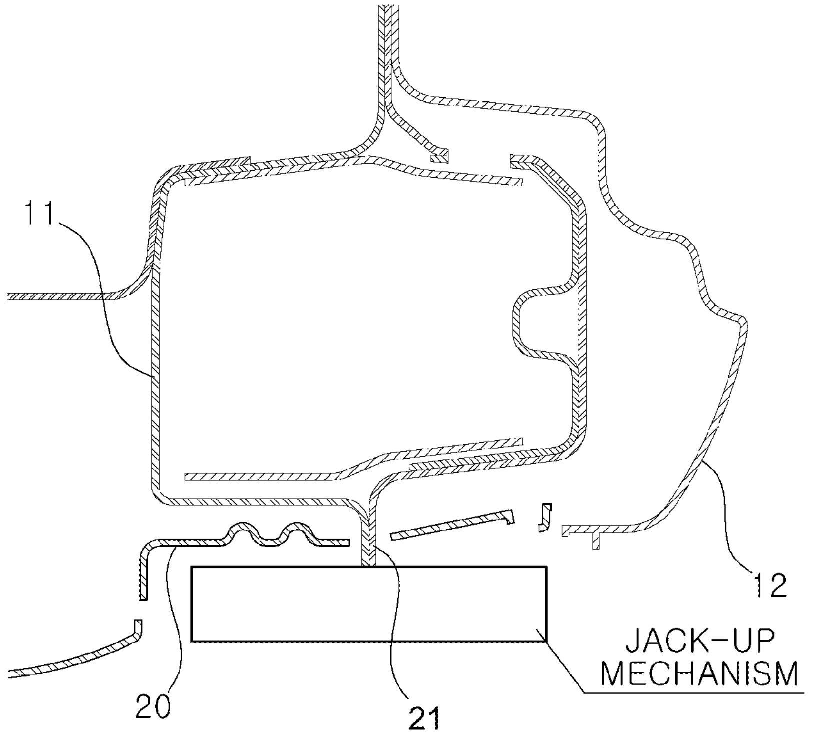
FIG. 10 is a view illustrating an example of a state of jacking up a vehicle after removing the jack-up cover.

According to the present disclosure, the vehicle may be lifted up by arranging the jack-up mechanism as illustrated in the example of FIG. 10 under the under-vehicle cover after separating the jack-up cover by the above-described method.

Figure 11:
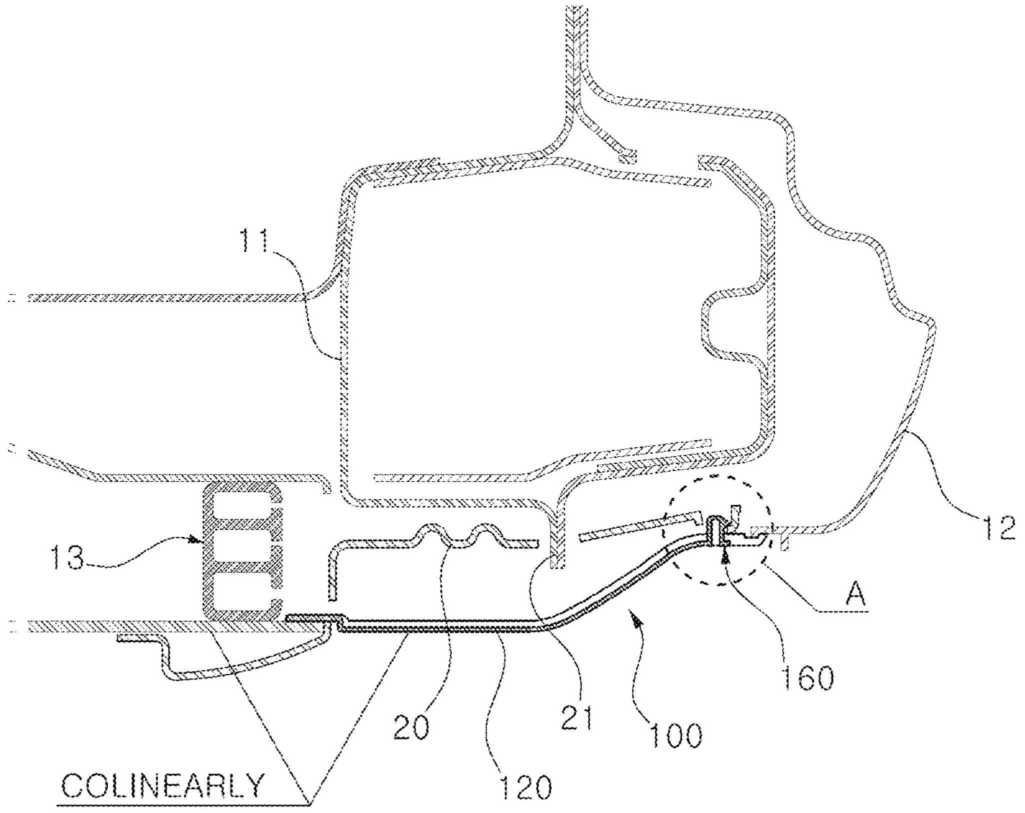
FIG. 11 is a view illustrating the positional relationship between the jack-up cover and a battery part.

In addition, as illustrated in FIG. 11, the lower cover part 120 of the jack-up cover 100 coupled to the under-vehicle cover 20 may have a structure extending colinearly with a lower end line of the battery part 13 to allow the jack-up cover 100 to protect the battery, which is a safety component, from foreign substances.

The jack-up cover forms colinearly with the battery part disposed under a floor of the vehicle and is connected to the side sill molding 12 to protect the vehicle body from foreign substances and form a more complete design.

Although the present disclosure has been described above with reference to the exemplary drawings, the present disclosure is not limited to the described implementations, and it is apparent to those skilled in the art that various modifications and changes can be made without departing from the spirit and scope of the present disclosure. Therefore, these modified examples or changed examples should be included in the claims of the present disclosure, and the scope of the present disclosure should be construed based on the appended claims.

What is claimed is:

1. A jack-up cover for an electric vehicle, wherein the jack-up cover being configured to be fastened to an under-vehicle cover and to cover a lower portion of a jack-up flange disposed at the under-vehicle cover, the jack-up cover comprising:

a first end portion that is configured to be fastened to an end portion of a battery part side of the under-vehicle cover; and a second end portion that is configured to be fastened to an end portion of (i) a side sill molding of the electric vehicle or (ii) a side sill molding side of the under-vehicle cover facing the side sill molding.

2. The jack-up cover of claim 1, further comprising:

a lower cover that defines a lower portion of the jack-up cover, the lower cover being configured to be fastened to the end portion of the battery part side of the under-vehicle cover;

a side cover that has a first end portion extending upward from a first end portion of the lower cover; and an upper cover that has a first end portion extending laterally from a second end portion of the side cover, the upper cover being configured to be fastened to the end portion of the side sill molding side of the under-vehicle cover.

3. The jack-up cover of claim 2, wherein the side cover extends upward and is inclined or curved from the first end portion of the lower cover.

4. The jack-up cover of claim 2, further comprising a first fastening part that protrudes laterally from a second end portion of the lower cover and is configured to be inserted into and fastened to a fastening hole defined at the end portion of the battery part side of the under-vehicle cover.

5. The jack-up cover of claim 4, further comprising a plurality of first fastenings including the first fastening part.

6. The jack-up cover of claim 4, wherein the first fastening part defines a bent portion that is stepped upward from the second end portion of the lower cover and extends laterally from the second end portion of the lower cover.

7. The jack-up cover of claim 4, further comprising a first clip that protrudes from a second end portion of the upper cover and is configured to be fastened to the under-vehicle cover.

8. The jack-up cover of claim 7, further comprising a plurality of first clips including the first clip.

9. The jack-up cover of claim 7, wherein the first clip extends downward from the under-vehicle cover and has a lower end portion configured to be fastened to a first clip coupling flange that includes a bent hooking portion of the electric vehicle.

10. The jack-up cover of claim 9, wherein the first clip extends upward from the upper cover and then extends laterally, and wherein the first clip comprises a protruding portion that protrudes laterally and is configured to be fastened to the bent hooking portion of the first clip coupling flange.

11. The jack-up cover of claim 10, wherein the first clip further comprises a clip extending portion that extends downward from the protruding portion and is configured to deform elastically by external force.

12. The jack-up cover of claim 7, further comprising a plurality of second clips that extend from both side end portions of the jack-up cover, respectively, each of the plurality of second clips being configured to be fastened to the under-vehicle cover.

13. The jack-up cover of claim 12, wherein an upper end portion of each of the plurality of second clips protrudes laterally and is configured to be fastened to a second clip coupling flange that extends upward from the under-vehicle cover.

14. The jack-up cover of claim 13, wherein a thickness of a lower end portion of each of the plurality of second clips is less than a thickness of a middle end portion thereof.

15. The jack-up cover of claim 7, wherein the lower cover defines a drainage hole, and wherein the side cover comprises a display part that is visually distinguished from other portions of the side cover.

16. The jack-up cover of claim 1, wherein the jack-up flange is disposed at the under-vehicle cover that covers a vehicle body of the electric vehicle by connecting a battery part of the electric vehicle with the side sill molding under the vehicle body.

17. The jack-up cover of claim 1, wherein the jack-up cover is detachable from the under-vehicle cover.

18. The jack-up cover of claim 16, wherein a lower end line of the jack-up cover extends colinearly with a lower end line of the battery part.

* * * * *